(12) United States Patent
Atwood et al.

(10) Patent No.: US 11,610,174 B2
(45) Date of Patent: Mar. 21, 2023

(54) SYSTEMS AND METHODS FOR IMPUTATION OF TRANSSHIPMENT LOCATIONS

(71) Applicant: P44, LLC, Chicago, IL (US)

(72) Inventors: Thomas Janos Atwood, San Francisco, CA (US); Milad Davaloo, Oakland, CA (US); Marc-Henri Paul Gires, New York, NY (US)

(73) Assignee: P44, LLC, Chicago, IL (US)

( * ) Notice: Subject to any disclaimer, the term of this patent is extended or adjusted under 35 U.S.C. 154(b) by 253 days.

(21) Appl. No.: 16/529,460

(22) Filed: Aug. 1, 2019

(65) Prior Publication Data

US 2021/0035059 A1 Feb. 4, 2021

(51) Int. Cl.
| | | |
|---|---|---|
| *G06Q 10/04* | (2012.01) | |
| *G06Q 10/08* | (2012.01) | |
| *G06Q 10/0831* | (2023.01) | |
| *G06Q 10/047* | (2023.01) | |
| *G06Q 10/0835* | (2023.01) | |
| *G06Q 10/083* | (2023.01) | |

(52) U.S. Cl.
CPC ....... *G06Q 10/0831* (2013.01); *G06Q 10/047* (2013.01); *G06Q 10/0838* (2013.01); *G06Q 10/08355* (2013.01)

(58) Field of Classification Search
CPC ............. G06Q 10/083; G06Q 10/0835; G06Q 10/08355
See application file for complete search history.

(56) References Cited

U.S. PATENT DOCUMENTS

| 6,427,913 B1* | 8/2002 | Maloney | G08B 13/2477 |
| | | | 235/383 |
| 9,082,234 B1* | 7/2015 | Clem | G06Q 20/407 |
| 9,786,187 B1* | 10/2017 | Bar-Zeev | G08G 5/0034 |
| 2005/0144089 A1* | 6/2005 | Kamiyama | G06Q 10/08 |
| | | | 705/330 |
| 2012/0030133 A1* | 2/2012 | Rademaker | G06Q 10/08 |
| | | | 705/333 |

(Continued)

OTHER PUBLICATIONS

Feng et al., Preventive transshipment decisions in a multi-location inventory system with dynamic approach, Computers & Industrial Engineering, 104 (2016), pp. 1-8 (Year: 2016).*

*Primary Examiner* — Omar Zeroual
*Assistant Examiner* — Duane N. Moore
(74) *Attorney, Agent, or Firm* — Marshall, Gerstein & Borun LLP

(57) ABSTRACT

The present disclosure provides systems and methods that impute planned transshipment locations for an itinerary associated with an item of cargo. In particular, according to one aspect of the present disclosure, a supply chain management computing system can obtain itinerary data that describes a planned shipment of an item of cargo from an origin location to a destination location. For example, the itinerary data can identify at least a shipping vehicle planned to transport the item of cargo. The supply chain management computing system can access vehicle location data associated with at least the shipping vehicle and can predict, based at least in part on the itinerary data and the vehicle location data, a transshipment location at which the item of cargo is transferred from the shipping vehicle to a different shipping vehicle.

14 Claims, 6 Drawing Sheets

(56) References Cited

U.S. PATENT DOCUMENTS

| | | | |
|---|---|---|---|
| 2013/0110396 A1* | 5/2013 | Choudhury | G06Q 10/08 |
| | | | 701/400 |
| 2015/0199653 A1* | 7/2015 | Cili | G06Q 10/1095 |
| | | | 705/7.19 |
| 2015/0370251 A1* | 12/2015 | Siegel | B64C 39/024 |
| | | | 701/2 |
| 2017/0178072 A1* | 6/2017 | Poornachandran | |
| | | | G06Q 20/3829 |
| 2017/0282942 A1* | 10/2017 | Mathews, Jr. | B61L 3/008 |
| 2018/0081374 A1* | 3/2018 | Nimchuk | G06Q 10/02 |
| 2018/0211217 A1* | 7/2018 | Berdinis | G05D 1/0291 |
| 2019/0043001 A1* | 2/2019 | Woulfe | G01C 21/3438 |
| 2019/0147610 A1* | 5/2019 | Frossard | G06T 7/20 |
| | | | 382/103 |

* cited by examiner

SYSTEMS AND METHODS FOR IMPUTATION OF TRANSSHIPMENT LOCATIONS

FIELD

The present disclosure relates generally to management of shipments, for example, as an aspect of supply chain management. More particularly, the present disclosure relates to systems and methods for imputation of transshipment locations for, for example, improved management and optimization of supply chains.

BACKGROUND

A supply chain can refer to or include a system of organizations, people, activities, information, and/or resources involved in moving materials, products, or other items from a supplier to a customer and/or one or more intermediaries between the supplier and the customer and/or among different sites operated by an organization. Organizations often seek to perform supply chain management and optimization by applying processes and tools to ensure the optimal operation of a manufacturing and distribution supply chain. This can include the optimal placement of inventory within the supply chain, minimizing operating costs (including manufacturing costs, transportation costs, and/or distribution costs), and/or other operational considerations. Supply chain management and optimization can be a critical component in bringing products to market at competitive price points.

Over the past decades, increases in global trade and manufacturing have resulted in an increase in the number of supply chains which require or include shipment of materials, products, or other items from one place to another. These shipments can include, for example, long distance shipments via shipping vehicles such as container ships, railcars, long-haul trucks, freight aircraft, and/or the like. Thus, a critical aspect of managing and optimizing a supply chain is monitoring, evaluating, or otherwise optimizing the shipment of materials, products, or other items from one location to another.

To achieve shipments as described above, a shipper (i.e., the entity seeking to acquire shipment services) can contract or otherwise interact with a carrier (i.e., the entity seeking to supply shipment services) to acquire shipment services to ship one or more items of cargo from a first location to a second, different location. In some instances, a shipper may include or be referred to as a beneficial cargo owner (BCO). In some instances, various additional parties (e.g., additional beyond those that are explicitly party to the shipment agreement) may have an interest or role in shipment of the cargo. As one example, a shipper may contract or otherwise interact with a third party lader or a freight forwarder, rather than directly with the carrier. As another example, a first carrier may subcontract with a second carrier to complete some portion of the shipment. As used herein, the terms "shipper" and "carrier" should be construed broadly to encompass all of the various parties which have an interest or role in shipment of the cargo.

The carrier can supply the shipper with an itinerary that identifies various attributes or characteristics of the planned shipment. The carrier can send the itinerary at the time the shipment agreement is entered into and/or periodically before and/or during completion of the shipment (e.g., as part of a "status update"). As an example, an itinerary can provide information regarding a route the shipment may take (e.g., by specifying the origin and/or destination of one or more shipping legs); identification of one or more shipping vehicles that will perform the shipment (e.g., the specific identification names, numbers, or codes (collectively referred to as "vehicle IDs") of one or more shipping vehicles that will carry the cargo); planned shipment dates (e.g., estimated dates of departure and/or arrival for the one or more shipping legs); identification of one or more particular containers in which the cargo will be shipped, stored, or otherwise housed (container IDs); and/or other information. As one example, an itinerary can take the form of an Electronic Data Interchange (EDI) message that provides scheduling and itinerary information related to a shipping vehicle such as an ocean vessel.

However, many carriers provide incomplete and/or inaccurate itineraries for shipments. These incomplete and/or inaccurate itineraries can result in suboptimal performance of the corresponding supply chain. In particular, as described above, supply chains often include the management and optimization of many interrelated processes, resources, and/or shipments. Incomplete and/or incorrect information can reduce the efficiency of such interrelated items, for example, by causing certain planned operations to be unknowingly delayed, which can result in increased manufacturing costs, transportation costs, and/or distribution costs. Furthermore, while incomplete information can be problematic due to increased uncertainty, incorrect information can be even more damaging, as it will often cause other planned processes to be incorrectly scheduled or otherwise planned with explicit error.

In many cases, the piece of information that is missing or incorrect in the carrier-supplied itinerary is a transshipment location. A transshipment location describes a location where an item of cargo (e.g., as housed within a container) is discharged from a shipping vehicle and loaded (e.g., either directly or after a holding period) onto a different shipping vehicle, before ultimately arriving at its destination. Improved understanding of such missing or incorrect transshipment locations would have large benefits in improving certainty and correctness of supply chain management and planning.

SUMMARY

Aspects and advantages of embodiments of the present disclosure will be set forth in part in the following description, or can be learned from the description, or can be learned through practice of the embodiments.

One example aspect of the present disclosure is directed to computer-implemented method for imputation of transshipment locations. The method includes obtaining, by a computing system comprising one or more computing devices, itinerary data that describes a planned shipment of an item of cargo from an origin location to a destination location, wherein the itinerary data identifies at least a shipping vehicle planned to transport the item of cargo. The method includes accessing, by the computing system, vehicle location data associated with at least the shipping vehicle. The method includes predicting, by the computing system and based at least in part on the itinerary data and the vehicle location data, a transshipment location at which the item of cargo is transferred from the shipping vehicle to a different shipping vehicle. The method includes inserting, by the computing system, the transshipment location into a data record associated with the planned shipment to produce an updated data record.

Another example aspect of the present disclosure is directed to supply chain management computing system. The computing system includes one or more processors and one or more non-transitory computer-readable media that collectively store instructions that, when executed by the one or more processors, cause the supply chain management computing system to perform operations. The operations include obtaining itinerary data that describes a planned shipment of an item of cargo from an origin location to a destination location, wherein the itinerary data identifies at least a shipping vehicle planned to transport the item of cargo. The operations include accessing vehicle location data associated with at least the shipping vehicle. The operations include predicting, based at least in part on the itinerary data and the vehicle location data, a transshipment location at which the item of cargo is transferred from the shipping vehicle to a different shipping vehicle. The operations include inserting the transshipment location into a data record associated with the planned shipment to produce an updated data record.

Another example aspect of the present disclosure is directed to one or more non-transitory computer-readable media that instructions that, when executed by the one or more processors, cause the supply chain management computing system to perform operations. The operations include obtaining itinerary data that describes a planned shipment of an item of cargo from an origin location to a destination location, wherein the itinerary data identifies at least a shipping vehicle planned to transport the item of cargo. The operations include predicting, based at least in part on the itinerary data, a transshipment location at which the item of cargo is transferred from the shipping vehicle to a different shipping vehicle. The operations include inserting the transshipment location into a data record associated with the planned shipment to produce an updated data record.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
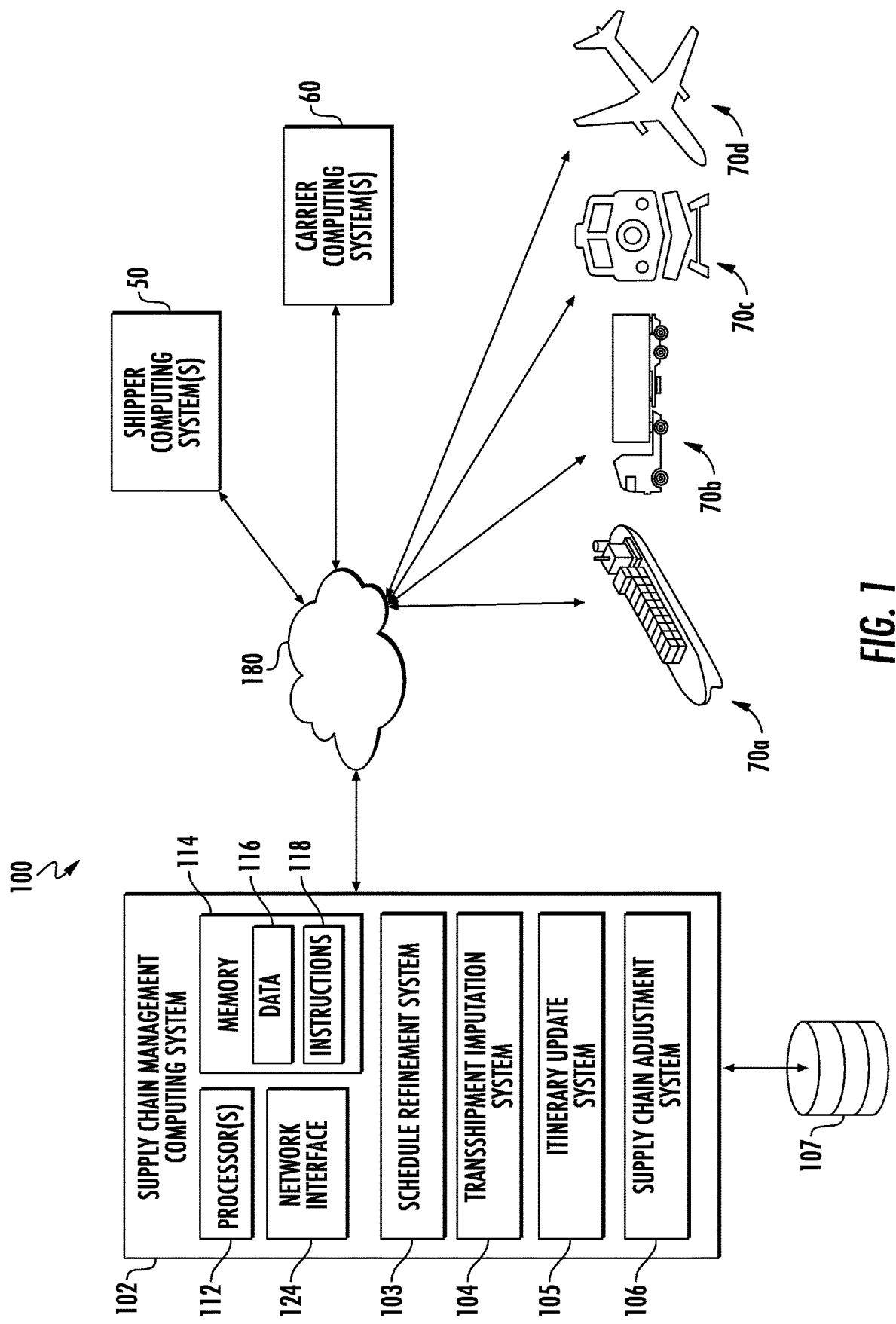
FIG. 1 depicts a block diagram of an example computing system for supply chain management according to example embodiments of the present disclosure.

Generally, aspects of the present disclosure are directed to a supply chain management computing system that provides predictive supply chain visibility. In particular, in some implementations, the supply chain management computing system can provide a platform through which shippers can view and manage their shipments (e.g., as provided by one or more carriers) and/or other supply chain operations or parameters. Thus, the platform can enable and allow shippers to track and trace global supply chain materials, products, or other items that are being shipped anywhere in the world at the inventory level. This service can generally be referred to as "supply chain visibility" or "transport visibility."

Aspects of the present disclosure are directed to technologies which enable the supply chain management computing system to provide "predictive" transport visibility. Specifically, predictive transport visibility refers to the use of predictive technologies (e.g., which may be underpinned by machine learning, artificial intelligence, and/or intelligent algorithmic approaches) to predict various aspects of the supply chain based on available data (e.g., which may be incomplete and/or inaccurate). Typically, the predictions can improve the accuracy of the information available through the platform and/or produce new insights not otherwise discernable from the underlying data. Thus, predictive transport visibility can allow a shipper to accurately track inventory in transit with increased confidence in its arrival. This increased accuracy can enable shippers to proactively manage customer expectations, adjust interrelated supply chain operations, and/or the like, resulting in improved efficiency and customer experience.

Specifically, the present disclosure is directed to systems and methods that impute planned transshipment locations for an itinerary associated with an item of cargo. In particular, according to one aspect of the present disclosure, a supply chain management computing system can obtain itinerary data that describes a planned shipment of an item of cargo from an origin location to one or more destination locations. The destination location(s) identified by the itinerary data can be a final destination and/or one or more intermediate destinations (e.g., known intermediate transshipment destinations). For example, the itinerary data can identify at least a shipping vehicle planned to transport the item of cargo. The supply chain management computing system can access vehicle location data associated with at least the shipping vehicle and can predict, based at least in part on the itinerary data and the vehicle location data, a transshipment location at which the item of cargo is transferred from the shipping vehicle to a different shipping vehicle.

As one example, to predict the transshipment location, the computing system can identify a set of the most probable transshipment locations based on an analysis of historical trips having similar transportation characteristics. Next, the computing system can use the vehicle location data to determine if the shipping vehicle is heading towards one of those locations. If there is a positive match between one of the probable locations and the schedule for the shipment vehicle, such location can be imputed as a transshipment location and inserted into a data record (e.g., which is stored in a database) associated with the planned shipment, thereby producing an updated data record. As another example, one or more machine-learned models can be used to predict the transshipment location(s) based at least in part on the itinerary data and/or the vehicle location data. The computing system can predict the timing or date of the transshipment as well.

Furthermore, in some implementations, the supply chain management computing system can also predict or otherwise update additional information regarding the item of cargo based on the imputed transshipment location, including, as examples, a current location of the item of cargo, a predicted date of discharge for the item of cargo at the destination, predicted identities of the shipment vehicle(s), and/or the like. As such, the imputed transshipment locations can be used to predict and improve the accuracy of data that is downstream or otherwise reliant upon the accuracy of the shipment itinerary. Such improved downstream data can then be used to make adjustments to various aspects of the supply chain as a whole (e.g., in an automated and/or intelligent fashion).

Thus, aspects of the present disclosure provide a solution for incomplete or inaccurate itineraries for shipments (e.g., containers transported via an ocean-going container ship). In particular, through prediction of transshipment locations, aspects of the present disclosure enable predictive visibility into shipment status, thereby enabling proactive supply chain management actions which improve supply chain efficiency and the customer experience. For example, a shipper of the item of cargo can access the updated data record (e.g., via a web application or platform supplied by the supply chain management computing system) to receive the updated information regarding the item of cargo and/or the supply chain management computing system can provide notifications, alerts, and/or the like to the shipper. This can enable the shipper to better optimize the supply chain to reflect or account the updated itinerary of the item of cargo.

With reference now to the Figures, example embodiments of the present disclosure will be discussed in further detail.

Example Devices and Systems

FIG. 1 depicts a block diagram of an example system 100 for supply chain management. The system 100 includes a supply chain management computing system 102, one or more shipper computing systems 50, and one or more carrier computing systems 60 that are communicatively connected over one or more networks 180.

Each shipper computing system 50 can be associated with a shipper that has contracted with or otherwise acquired the services of a carrier to provide shipment services relative to one or more items of cargo. A shipper computing system 50 can include any number of computing devices such as laptops, desktops, personal devices (e.g., smartphones), server devices, etc.

Likewise, each of the carrier computing systems 60 can be associated with a carrier that has contracted with or otherwise agreed to supply shipment services to a shipper. A carrier computing system 60 can include any number of computing devices such as laptops, desktops, personal devices (e.g., smartphones), server devices, etc.

Generally, a carrier can operate or charter one or more shipment vehicles (e.g., vehicles 70*a-d*) to provide shipment services. Shipment vehicles can include ships 70*a* (e.g., oceangoing ships such as container ships, river barges, etc.); ground-based vehicles 70*b* (e.g., long haul trucks, vans, cars, etc.); rail-based vehicles 70*c* (e.g., railcars or freight trains); aircraft (e.g., air freight vehicles, commercial airlines, drones, etc.); spacecraft; and/or other forms of vehicles. The vehicles 70*a-d* can be humanly operated vehicles and/or can be autonomous vehicles.

Transshipment of cargo can be performed between two vehicles of the same transportation modality (e.g., ship to ship) or between two vehicles of different transportation modalities (e.g., ship to rail).

In some instances, certain vehicles 70*a-d* may be known to be related to certain other vehicles 70*a-d*. As one example, a first vehicle may be known to be related to a second vehicle if both the first vehicle and the second vehicle are operated by the same carrier. As another example, a first vehicle may be known to be related to a second vehicle if both the first vehicle and the second vehicle are included within and operate in accordance with a shared carrier network. More particularly, certain carriers may agree to participate or align with each other within a carrier network, for example, for reasons of efficiency, increased global reach, or the like. This network may take the form of an alliance, partnership, contractual arrangement, or the like which enables cargo to be transshipped among network participant vehicles with reduced administrative overhead. Thus, despite being operated by different carriers, a first vehicle may be known to be related to a second vehicle if the two different carriers are aligned within a carrier network. Information about vehicle relations can be stored in any of the different illustrated computing systems or can be accessed from a third party information system (not shown).

The supply chain management computing system 102 can provide a platform via which a shipper can track and trace global supply chain materials, products, or other items that are being shipped anywhere in the world at the inventory level. Tracking at the inventory level can include tracking individual items of inventory (e.g., a specific parcel), tracking certain containers (e.g., a specific container), and/or tracking larger bulk commodities such as a large volume of oil, grain, etc. The platform can be provided as or via a web application, an application run at a shipper computing system 50 (e.g., for which the computing system 102 serves as a backend), and/or via other techniques.

The supply chain management computing system 102 can include any number of computing devices such as laptops, desktops, personal devices (e.g., smartphones), server devices, etc. Multiple devices (e.g., server devices) can operate in series and/or in parallel.

The supply chain management computing system 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the supply chain management computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

The supply chain management computing system 102 can also include a network interface 124 used to communicate with one or more systems or devices, including systems or devices that are remotely located from the supply chain management computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

In general, the supply chain management computing system 102 can receive and synthesize information from each of the shipper computing systems 50, the carrier computing systems 60, and/or shipment vehicles 70a-d to produce reports, data tables, status updates, alerts, and/or the like that provide information regarding the current and predicted status of shipments, including, for example, at the container (e.g., twenty-foot equivalent unit container) and/or item of cargo level. In some implementations, communications between the system 102 and one or more of the shipper computing systems 50, the carrier computing systems 60, and/or shipment vehicles 70a-d can occur via or according to one or more application programming interfaces (APIs), to facilitate automated and/or simplified data acquisition and/or transmission.

As one example communication, the supply chain management computing system 102 can receive itinerary data that has been produced by a carrier for the shipment of an item of cargo. The supply chain management computing system 102 can receive the itinerary data directly from the carrier (e.g., from a carrier computing system 60) or the itinerary data can be received by the shipper from the carrier and then supplied by the shipper to the supply chain management computing system 102 (e.g., using a shipper computing system 50).

The itinerary data can describe various attributes or characteristics of the planned shipment. As an example, an itinerary can provide information regarding a route the shipment may take (e.g., by specifying the origin and/or destination of one or more shipping legs); identification of one or more shipping vehicles that will perform the shipment (e.g., the specific identification names, numbers, or codes (vehicle IDs) of one or more shipping vehicles that will carry the cargo); planned shipment dates (e.g., estimated dates of departure and/or arrival for the one or more shipping legs); identification of one or more particular containers in which the cargo will be shipped, stored, or otherwise housed (container IDs); and/or other information. As one example, the itinerary data can take the form of an EDI message (e.g., received via or according to an API) that provides scheduling and itinerary information related to a shipping vehicle such as an ocean vessel.

However, many carriers provide incomplete and/or inaccurate itineraries for shipments. These incomplete and/or inaccurate itineraries can result in suboptimal performance of the corresponding supply chain. In many cases, the piece of information that is missing or incorrect in the carrier-supplied itinerary is a transshipment location (or a reliable indication that there will not be any transshipment locations).

A transshipment location describes a location where an item of cargo (e.g., as included within a container) is discharged from a shipping vehicle and loaded (either directly or after a holding period) onto a different shipping vehicle, before ultimately arriving at its destination. Thus, in one example, the itinerary data may identify only the origin shipping vehicle that will receive or load the item of cargo at the origin location. However, similar to lack of transshipment information, the itinerary data may fail to identify further vehicles that will transport the item of cargo from the transshipment location to another location (e.g., another transshipment location or the destination). In another example, the itinerary data may identify only a subsequent shipping vehicle that will receive the cargo at some point in the future, but may not identify the origin shipping vehicle or the location at which the subsequent shipping vehicle obtains the cargo (e.g., via transshipment). Thus, the shipping vehicle(s) identified by the itinerary data may be incomplete and may include various vehicles that are expected to be used at different stage(s) of the shipment.

As another example communication, the supply chain management computing system 102 can receive or obtain vehicle location data. The vehicle location data can be or include vehicle schedule data, vehicle tracking data, in-house schedule data that is developed in-house by the entity that operates the supply chain management computing system, and/or data regarding the location of a vehicle gleaned from itinerar(ies) associated with other, different items of cargo.

Thus, one type of vehicle location data is vehicle schedule data. The vehicle schedule data can provide a respective schedule for each vehicle 70a-d. The schedule can provide a list of locations (e.g., ports, railyards, distribution centers, etc.) that the vehicle has or is scheduled to visit. In some instances, certain scheduled dates may be associated with the scheduled locations provided by the vehicle schedule data for the vehicle. Often, however, the date information in the vehicle schedule data is inaccurate (e.g., fails to reflect/account for delays which have caused the date information to be outdated/inaccurate). Similarly, vehicle schedule data can be incomplete (e.g., missing certain intermediate stops or locations).

Similarly to the itinerary data, in some implementations, the supply chain management computing system 102 can receive the vehicle schedule data directly from the carrier (e.g., from a carrier computing system 60). Alternatively, the vehicle schedule data can be received by the shipper from the carrier and then supplied by the shipper to the supply chain management computing system 102 (e.g., using a shipper computing system 50). As another possibility, a third party service (not shown) may maintain and supply (e.g., via an API) vehicle schedule data on behalf and/or in collaboration with carriers.

In some implementations, carriers can provide updated vehicle schedule data periodically (e.g., daily). In some implementations, similarly to the itinerary data, the vehicle schedule data can take the form of an EDI message.

Another type of vehicle location data is vehicle tracking data. In particular, as another example communication, the supply chain management computing system 102 can receive or obtain vehicle tracking data associated with the vehicles 70*a-d*. Vehicle tracking data can include data generated by the vehicles 70*a-d* or devices located on the vehicles 70-*ad* that describe a current location of the vehicles 70*a-d*. As an example, tracking data can include satellite positioning data (e.g., GPS data) or similar.

As another example, vehicle tracking data can include automatic identification system (AIS) data. The AIS is an automatic tracking system that uses transponders on ships to identify the current locations (e.g., with some margin of error) of the ships. Information provided by AIS equipment, such as unique identification, position, course, and speed, can be obtained by the carrier computing systems 60 and/or a third party system (not shown) and supplied (e.g., via an API) to the supply chain management computing system 102.

Another type of vehicle location data is data regarding the location of a vehicle gleaned from itinerar(ies) associated with other, different items of cargo. For example, a carrier may supply a first itinerary for an Item of Cargo A that fails to identify a transshipment location for the Item of Cargo A, but does indicate that the Item of Cargo A will be shipped using Shipping Vehicle A. However, for an Item of Cargo B, the same or different carrier may indicate that Item of Cargo B will be shipped using Shipping Vehicle A, and further that Shipping Vehicle A will be visiting Location A at which point the Item of Cargo B will be transshipped. This information can be used to determine a future vehicle location for Shipping Vehicle A. In particular, it can be determined that Shipping Vehicle A will visit Location A and such information can be used to impute a transshipment location for Item of Cargo A, thereby resolving the failure of the first itinerary to identify Location A.

According to aspects of the present disclosure, the supply chain management computing system 102 can include a schedule refinement system 103, a transshipment imputation system 104, an itinerary update system 105, and a supply chain adjustment system 106. The operations of each of these systems are discussed in greater detail elsewhere herein.

The schedule refinement system 103 can refine the vehicle schedule data to improve the accuracy of the vehicle schedule data, thereby producing refined vehicle schedule data. As examples, the schedule refinement system 103 can refine the vehicle schedule data based on additional schedule data from other carriers; data obtained from ports, railyards, distribution centers, and/or the like; historical vehicle schedule data or inferences (e.g., interpolations) derived therefrom; vehicle tracking (e.g., AIS) data; and/or the like. In some implementations, the schedule refinement system 103 can merge such multiple sources of data by performing a dynamic programming algorithm using a metric that measures delay. As one example, a branch and bound algorithm can be performed on the vehicle schedule data to match sequences of scheduled locations to minimize error without violating any constraints.

In some implementations, the schedule refinement system 103 can include and use one or more machine-learned schedule refinement models to generate refined schedule data based on the additional schedule data from other carriers; data obtained from ports, railyards, distribution centers, and/or the like; historical vehicle schedule data or inferences (e.g., interpolations) derived therefrom; vehicle tracking (e.g., AIS) data; and/or the like. For example, the machine-learned schedule refinement models can be configured to receive and process such data to produce refined vehicle schedule data.

The transshipment imputation system 104 can impute the location of one or more transshipments based on the itinerary data and/or the vehicle schedule data (e.g., the refined vehicle schedule data). As one example, to predict the transshipment location, the transshipment imputation system 104 can identify a set of the most probable transshipment locations based on historical trips having similar transportation characteristics. Next, the transshipment imputation system 104 can use the vehicle schedule data to determine if the shipping vehicle is heading towards one of those locations. If there is a positive match (e.g., subject to certain constraints) between one of the probable locations and the schedule for the shipment vehicle, such location can be imputed as a transshipment location and inserted into a data record (e.g., stored in a database) associated with the planned shipment, thereby producing an updated data record.

As another example, the transshipment imputation system 104 can include and use one or more machine-learned transshipment imputation models to predict the transshipment location(s) based at least in part on the itinerary data and/or the vehicle schedule data. For example, the machine-learned transshipment imputation models can be configured to receive and process the itinerary data, the vehicle schedule data, and/or other forms of data to produce one or more predicted transshipment locations.

The itinerary update system 105 can update the itinerary maintained for the item of cargo by the supply chain management system 102 based on the imputed transshipment location(s). For example, updating the itinerary can include inserting the imputed transshipment location into a data record (e.g., stored in a database 107) associated with the itinerary, the item of cargo, and/or a shipment number. In some implementations, the itinerary update system 105 can also predict or otherwise update additional information regarding the item of cargo based on the imputed transshipment location, including, as examples, a current location of the item of cargo, a predicted date of discharge for the item of cargo at the destination, predicted identities of the shipment vehicle(s), and/or the like.

In some implementations, the itinerary update system 105 can include and use one or more machine-learned itinerary update models to generate updates to the itinerary based on the imputed transshipment locations. For example, the machine-learned itinerary update models can be configured to receive and process data that describes the original itinerary data and imputed changes to the itinerary data (e.g., addition of transshipment locations) to produce additional updates to the itinerary (e.g., updated discharge dates, etc.).

The supply chain adjustment system 106 can perform automatic supply chain adjustments based on the updated itinerary. As examples, the supply chain adjustment system 106 can proactively detect, share and resolve shipment issues. For example, the supply chain adjustment system 106 can generate and transmit automatic alerts to the shipper, carrier, and/or customers and/or partners of the shipper that indicate the updated itinerary. The alerts can provide the updated information and, in some implementations, include adjustments to previously provided orders, requests, invoices, and/or the like. Thus, for example, if it is detected based on the imputed transshipment that the item of cargo will now be two days earlier, the delivery of materials or products planned to be combined (e.g., in a manufacturing sense) with such item of cargo can be requested to be supplied by other providers two days earlier as well, thereby enabling the most efficient combination of the item of cargo with such materials or products. Likewise, the labor associated with the combination can be automatically scheduled for two days earlier than previously requested. As another example, an invoice can be automatically sent based on the updated itinerary. Thus, in some implementations, logical connections and/or dependencies between multiple different shipments, orders, labor requests, facilities management plans, and/or the like can be established (e.g., by the shipper and/or a customer of the shipper) and these logical connections can be used to perform automatic supply chain adjustments.

In some implementations, the supply chain adjustment system 106 can include and use one or more machine-learned supply chain adjustment models to generate adjustments to one or more facets of a supply chain that are interrelated to the item of cargo based on the updated itinerary. For example, the machine-learned supply chain adjustment models can be configured to receive and process data that describes the original itinerary data and the updated itinerary data to produce automatic supply chain adjustments (e.g., modification of requested delivery dates or labor fulfillment dates).

Each of the schedule refinement system 103, the transshipment imputation system 104, the itinerary update system 105, and the supply chain adjustment system 106 can include computer logic utilized to provide desired functionality. Each of the schedule refinement system 103, the transshipment imputation system 104, the itinerary update system 105, and the supply chain adjustment system 106 can be implemented in hardware, firmware, and/or software controlling a general purpose processor. For example, in some implementations, each of the schedule refinement system 103, the transshipment imputation system 104, the itinerary update system 105, and the supply chain adjustment system 106 includes program files stored on a storage device, loaded into a memory and executed by one or more processors. In other implementations, each of the schedule refinement system 103, the transshipment imputation system 104, the itinerary update system 105, and the supply chain adjustment system 106 includes one or more sets of computer-executable instructions that are stored in a tangible computer-readable storage medium such as RAM hard disk or optical or magnetic media.

The database 107 can be one database or multiple databases. If multiple databases are used, they can be co-located or geographically distributed. The database 107 can store any and all of the different forms of data described herein and can be accessed and/or written to by any of the systems 103-106. In some implementations, the database 107 can also store historical shipping data that can be used, for example, as training data for any of the machine-learned models described herein and/or as the basis for imputing certain information for current shipping data.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
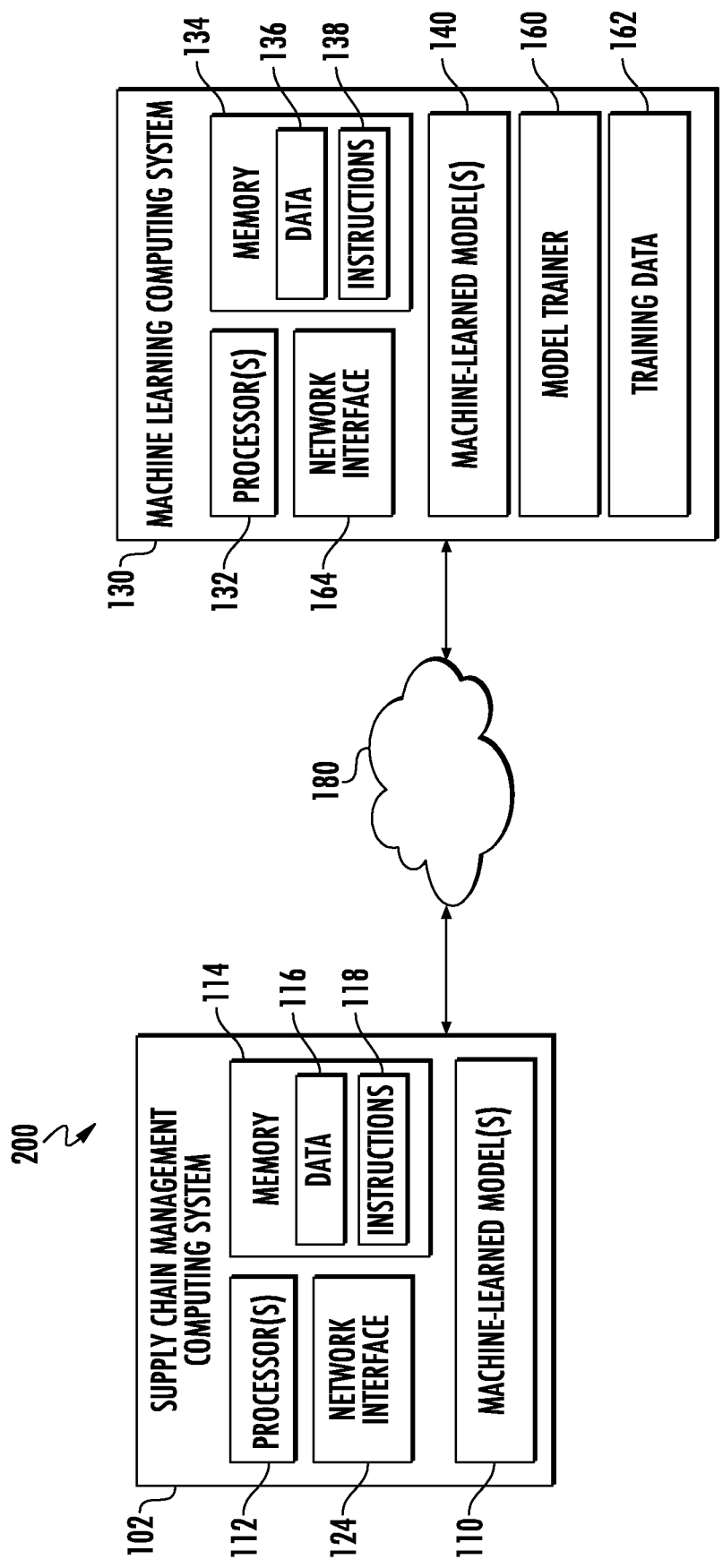
FIG. 2 depicts a block diagram of an example computing system for using and enabling machine-learned models according to example embodiments of the present disclosure.

As described above, in some implementations, some or all of the schedule refinement system 103, the transshipment imputation system 104, the itinerary update system 105, and the supply chain adjustment system 106 can include one or more machine-learned models. FIG. 2 depicts an example computing system 200 for enabling the schedule refinement system 103, the transshipment imputation system 104, the itinerary update system 105, and/or the supply chain adjustment system 106 to include machine learning components according to example embodiments of the present disclosure. The example system 200 can be included in or implemented in conjunction with the example system 100 of FIG. 1. The system 200 includes the supply chain management computing system 102 and a machine learning computing system 130 that are communicatively coupled over the network 180.

As illustrated in FIG. 2, in some implementations, the supply chain management computing system 102 can store or include one or more machine-learned models 110 (e.g., any of the models discussed herein). For example, the models 110 can be or can otherwise include various machine-learned models such as a random forest model; a logistic regression model; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

In some implementations, the supply chain management computing system 102 can receive the one or more machine-learned models 110 from the machine learning computing system 130 over network 180 and can store the one or more machine-learned models 110 in the memory 114. The supply chain management computing system 102 can then use or otherwise implement the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the supply chain management computing system 102, the machine learning computing system 130 can include one or more machine-learned models 140. For example, the models 140 can be or can otherwise include various machine-learned models such as a random forest model; a logistic regression model; a support vector machine; one or more decision trees; a neural network; and/or other types of models including both linear models and non-linear models. Example neural networks include feed-forward neural networks, recurrent neural networks (e.g., long short-term memory recurrent neural networks), convolutional neural networks, or other forms of neural networks.

As an example, the machine learning computing system 130 can communicate with the supply chain management computing system 102 according to a client-server relationship. For example, the machine learning computing system 140 can implement the machine-learned models 140 to provide a web service to the supply chain management computing system 102. For example, the web service can provide a transshipment location prediction service and/or other machine learning services as described herein.

Thus, machine-learned models 110 can be located and used at the supply chain management computing system 102 and/or machine-learned models 140 can be located and used at the machine learning computing system 130.

In some implementations, the machine learning computing system 130 and/or the supply chain management computing system 102 can train the machine-learned models 110 and/or 140 through use of a model trainer 160. The model trainer 160 can train the machine-learned models 110 and/or 140 using one or more training or learning algorithms. One example training technique is backwards propagation of errors ("backpropagation"). For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The model trainer 160 can be implemented in hardware, software, firmware, or combinations thereof.

The training data 162 can include, for example, historical data that indicates the historical outcomes of various previous shipments (e.g., which may take the form of shipping logs). In some implementations, the training data 162 can include a plurality of training example pairs, where each training example pair provides: (1) a set of data (e.g., incorrect and/or incomplete data); and (2) a ground truth label associated with such set of data, where the ground truth label provides a "correct" prediction for the set of data. For example, the training example can include: (1) itinerary and/or vehicle schedule data that was collected prior or during a shipment; and (2) a ground truth label derived from historical data that indicates what the actual itinerary or schedule was for such shipment.

As one example, a training example pair can include: (1) additional schedule data from carriers; data obtained from ports, railyards, distribution centers, and/or the like; historical vehicle schedule data or inferences (e.g., interpolations) derived therefrom; vehicle tracking (e.g., AIS) data; and/or the like; and (2) refined vehicle schedule data. As another example, a training example pair can include: (1) itinerary data, vehicle schedule data, and/or other forms of data; and (2) one or more ground truth transshipment locations. As yet another example, a training example pair can include: (1) an original set of itinerary data and changes to such itinerary data (e.g., addition of transshipment locations); and (2) additional updates to the itinerary (e.g., predicted new discharge dates, etc.). As another example, a training example pair can include: (1) data that describes an original itinerary and an updated itinerary (e.g., including predicted new transshipment locations, predicted new discharge dates, etc.); and (2) automatic supply chain adjustments (e.g., modification of requested delivery dates or labor fulfillment dates) that should be performed based on change from the original itinerary to the updated itinerary.

FIG. 2 illustrates one example computing system 200 that can be used to implement the present disclosure. Other computing systems can be used as well. For example, in some implementations, the supply chain management computing system 102 can include the model trainer 160 and the training dataset 162. In such implementations, the machine-learned models 110 can be both trained and used locally at the supply chain management computing system 102. As another example, in some implementations, the supply chain management computing system 102 is not connected to other computing systems.

Example Methods

Figure 3:
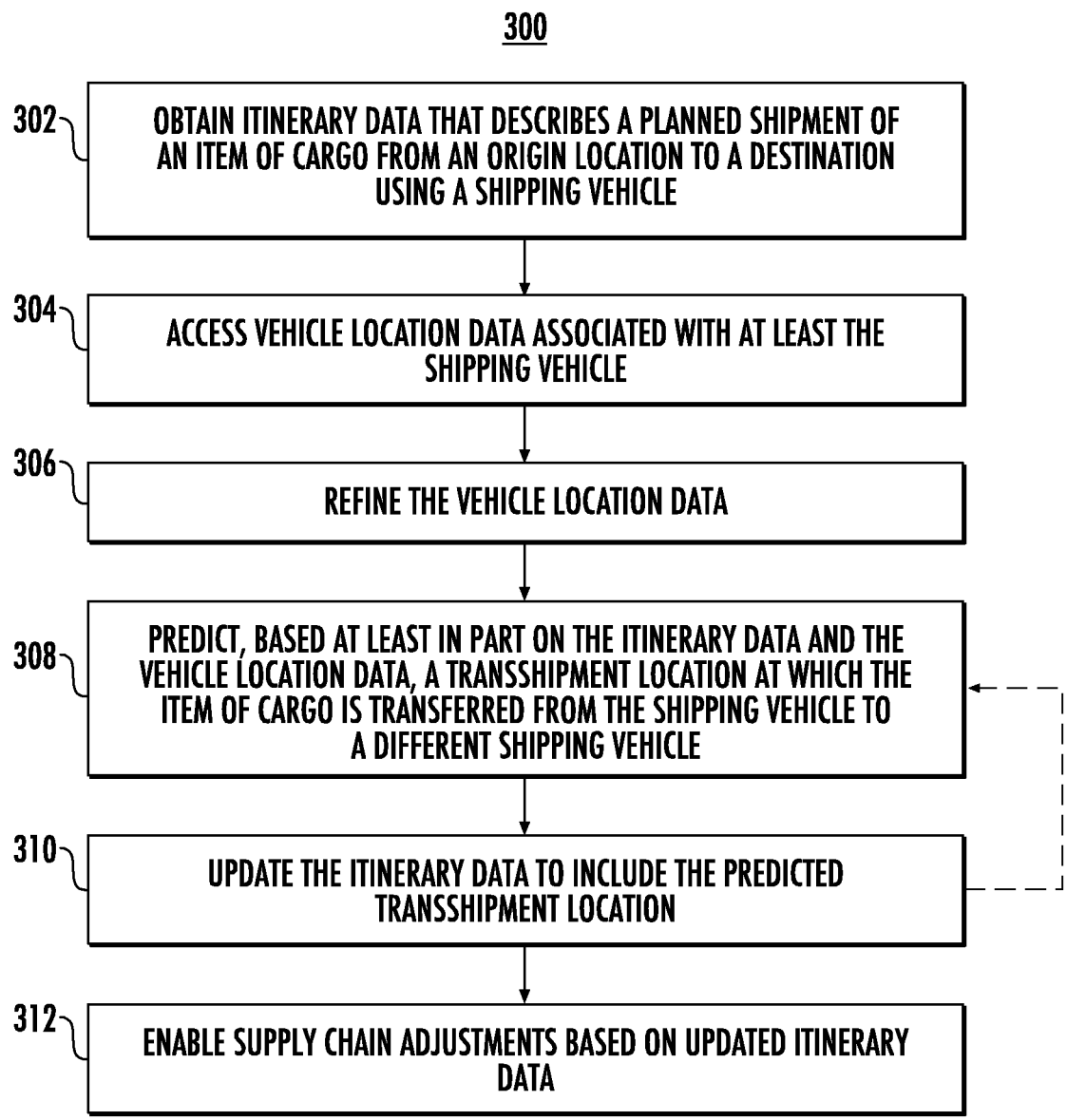
FIG. 3 depicts a flow chart diagram of an example method to perform supply chain management according to example embodiments of the present disclosure.

FIG. 3 depicts a flow chart diagram of an example method 300 to perform supply chain management according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain itinerary data that describes a planned shipment of an item of cargo from an origin location to a destination. The itinerary data can describe various attributes or characteristics of the planned shipment. As an example, an itinerary can provide information regarding a route the shipment may take (e.g., by specifying the origin and/or destination of one or more shipping legs); identification of one or more shipping vehicles that will perform the shipment (e.g., the specific identification names, numbers, or codes (vehicle IDs) of one or more shipping vehicles that will carry the cargo); planned shipment dates (e.g., estimated dates of departure and/or arrival for the one or more shipping legs); identification of one or more particular containers in which the cargo will be shipped, stored, or otherwise housed (container IDs); and/or other information. As one example, the itinerary data can take the form of an EDI message that provides scheduling and itinerary information related to a shipping vehicle such as an ocean vessel. In some implementations, the itinerary data may identify only the origin shipment vehicle that will receive or load the item of cargo at the origin location. In other implementations, multiple vehicles may be specified (e.g., in a sequence). If multiple vehicles are identified, the method 300 can be performed separately for each vehicle, performed only for the original vehicle, or performed only for a final vehicle in the sequence of identified vehicles.

At 304, the computing system accesses vehicle location data associated with at least the shipping vehicle. For example, the vehicle location data can include vehicle schedule data and/or vehicle tracking data. The vehicle schedule data can provide a respective schedule for each vehicle of a number of vehicles (e.g., including the first shipment vehicle). The schedule can provide a list of locations (e.g., ports, railyards, distribution centers, etc.) that each vehicle has or is scheduled to visit. In some instances, certain scheduled dates may be associated with the scheduled locations provided by the vehicle schedule data for the vehicle. Often, however, the date information in the vehicle schedule data is inaccurate (e.g., fails to reflect/account for delays which have caused the date information to be outdated/inaccurate). Similarly, vehicle schedule data can be incomplete (e.g., missing certain intermediate stops or locations).

At 306, the computing system refines the vehicle location data to improve the accuracy of the vehicle location data, thereby producing refined vehicle location data. As examples, at 306 the computing system can refine or otherwise cross-validate the vehicle schedule data or based on additional schedule data from other carriers; data obtained from ports, railyards, distribution centers, and/or the like; historical vehicle schedule data or inferences (e.g., interpolations) derived therefrom; vehicle tracking (e.g., AIS) data; and/or the like. In some implementations, the computing system can merge such multiple sources of data by performing a dynamic programming algorithm using a metric that measures delay. As one example, a branch and bound algorithm can be performed on the vehicle schedule data to match sequences of scheduled locations to minimize error without violating any constraints. As another example, refining the vehicle location data can include extrapolating a future location of a shipping vehicle based on its vehicle tracking data (e.g., the tracking data indicates that the vehicle is heading toward a particular destination).

To provide one simplified example for illustration, assume a set of vehicle schedule data indicates the following example simplified schedule for the first shipment vehicle:

Location A on Day 5; Location B on Day 10; Location C on Day 13; Location A on Day 20: Location D on Day 27; Location E on Day 30.

To generate the refined schedule data, the computing system can search (e.g., using a branch and bound algorithm) for alternative dates at which the first shipment vehicle could visit the scheduled locations (e.g., where the solution minimizes some measure of error). In some implementations, the search is conducted subject to certain constraints. As one example, the search may be constrained to keep the relative spacing of days between locations to match the original spacing provided in the raw vehicle schedule data. For example, if the raw vehicle schedule data indicates 5 days of spacing between Location A and Location B, then the search process may be constrained to provide solutions that also indicate 5 days of spacing between Location A and Location B (e.g., but with different specific dates of visit). However, other implementations do not employ such a constraint or may treat it as a soft constraint that is baked into the error formulation (e.g., as exemplified below). As another example, a constraint may include constraining the solution to include the same sequence of locations as the raw schedule data (e.g., the solution must follow the sequence A>B>C>A>D>E).

One example error function seeks to refine the vehicle schedule data to align with other, more accurate data, while minimizing the magnitude of the change made to the vehicle schedule data. One example error function is as follows:

$$\text{Error} = |A_1 - A_2| + |(B_1 - A_1) - (B_2 - A_2)| + |(C_1 - B_1) - (C_2 - B_2)| \ldots$$

where $A_1$ indicates the date of visit to Location A provided by the raw vehicle schedule data, $A_2$ indicates the date of visit to Location A proposed by the candidate solution, and so on.

To continue the specific example above, assume that, in addition to the raw vehicle schedule data, the computing system has obtained some other form of data that indicates with higher trustworthiness the current or scheduled location of the shipping vehicle. As one example, assume that AIS data indicates that the shipping vehicle is at Location A at Day 10. As another example, assume that the computing system can interpolate or project, based on AIS data that indicates a trajectory of the shipping vehicle, that the shipping vehicle was or will be at Location A at Day 10.

Using an error function (e.g., such as the example error function provided above), the computing system can enumerate and evaluate a number of different possible candidate schedules and can select one of the candidate schedules (e.g., that has the smallest error without violating any constraints) to use as the refined vehicle schedule. To continue the example, evaluating the error function provided above for a number of candidates can result in identifying a refined vehicle schedule as follows:

Location A on Day 10; Location B on Day 15; Location C on Day 18; Location A on Day 25: Location D on Day 32; Location E on Day 35.

For example, the above refined schedule exhibits less error than the following candidate schedule: Location A on Day −5; Location B on Day 0; Location C on Day 3; Location A on Day 10: Location D on Day 17; Location E on Day 20.

As another example, in some implementations, at 306, the computing system can include and use one or more machine-learned schedule refinement models to generate refined schedule data based on the additional schedule data from other carriers; data obtained from ports, railyards, distribution centers, and/or the like; historical vehicle schedule data or inferences (e.g., interpolations) derived therefrom; vehicle tracking (e.g., AIS) data; and/or the like. For example, the machine-learned schedule refinement models can be configured to receive and process such data to produce refined vehicle schedule data.

In other implementations, the method 300 can be performed without refining the vehicle location data (e.g., can be performed using the raw vehicle location data). As such, further references to the "vehicle location data" with respect to FIG. 3 or the subsequent Figures should be interpreted to refer to the refined vehicle location data and/or the raw vehicle location data.

At 308, the computing system predicts, based at least in part on the itinerary data and the vehicle location data, a transshipment location at which the item of cargo is transferred from the shipping vehicle to a different shipping vehicle. The computing system can optionally predict the time or date of the transshipment as well.

Figure 4:
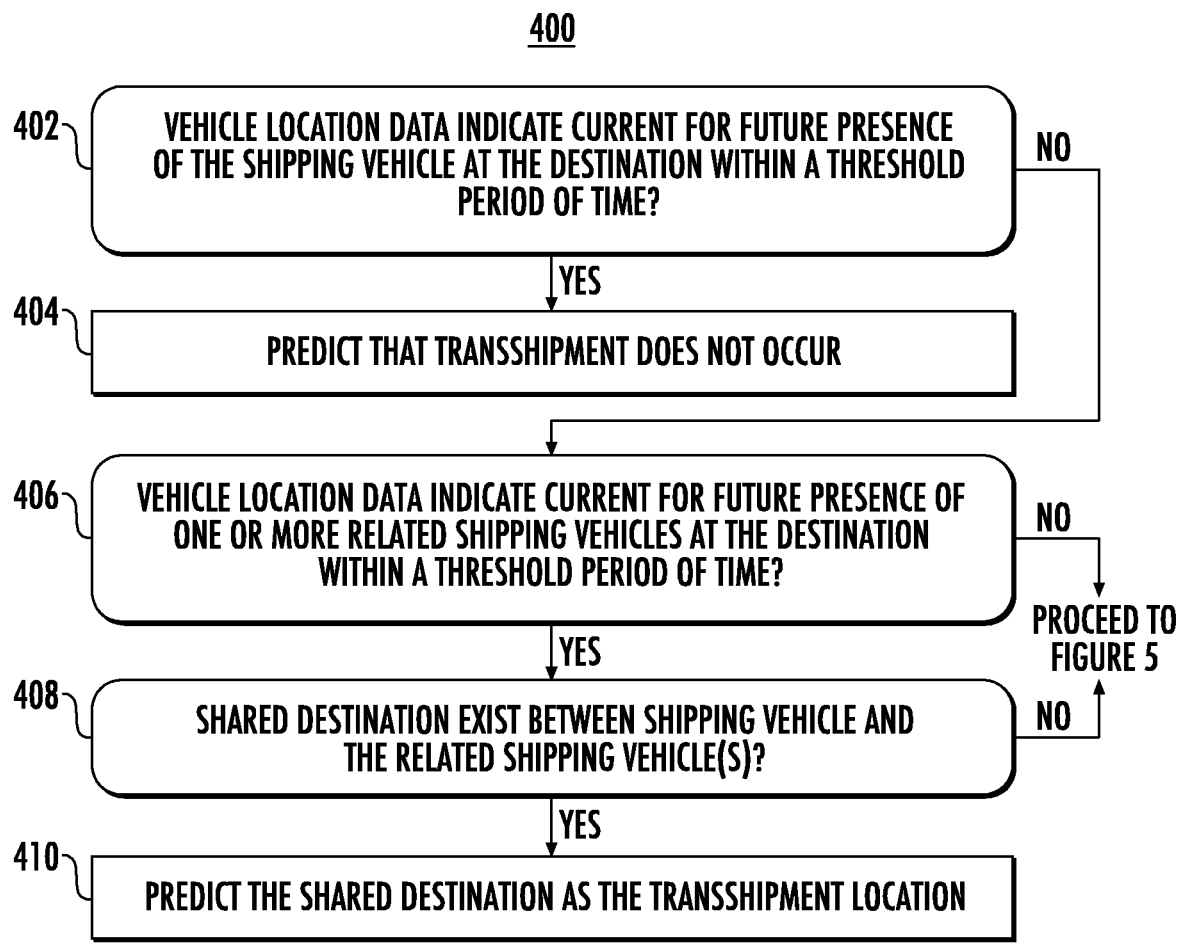
FIG. 4 depicts a flow chart diagram of an example method for imputation of transshipment locations according to example embodiments of the present disclosure.

As one example technique to predict the transshipment location, FIG. 4 depicts a flow chart diagram of an example method 400 to impute transshipment locations according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can determine whether the vehicle location data indicates a current or future presence of the shipping vehicle at the destination within a threshold period of time from the currently estimated destination discharge date (e.g., within 30 days, within 60 days, etc.).

If it is determined at 402 that the vehicle location data indicates a current or future presence of the shipping vehicle at the destination within the threshold period of time, the method 400 can proceed to 404. At 404, the computing system can predict that transshipment does not occur. In such fashion, if it is likely that the item of cargo will simply remain aboard the shipping vehicle until it reaches the destination, then the system can predict that transshipment does not occur. This prediction of the absence of transshipment can still improve the certainty and accuracy of the itinerary.

However, if it is determined at 402 that the vehicle location data does not indicate a current or future presence of the shipping vehicle at the destination within the threshold period of time, then method 400 can proceed to 406.

At 406, the computing system can determine whether the vehicle location data indicates a current or future presence of one or more related shipping vehicles at the destination within a threshold period of time from the currently estimated destination discharge date (e.g., within 30 days, within 90 days, etc.). For example, related vehicles can include vehicles that are operated by the same carrier or are included within a shared carrier network.

If it is determined at 406 that the vehicle location data indicates a current or future presence of one or more related shipping vehicles at the destination within the threshold period of time, the method 400 can proceed to 408.

Figure 5:
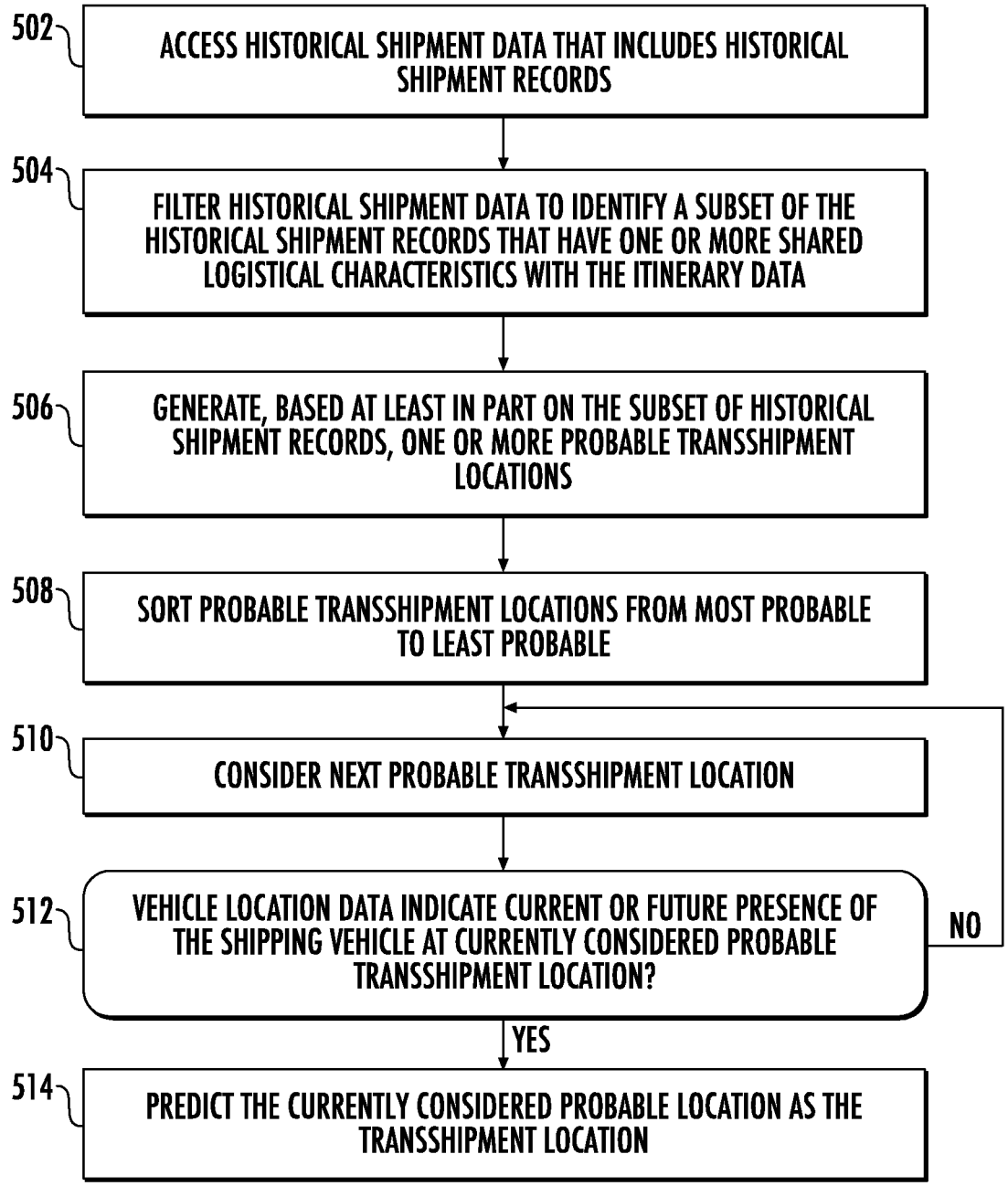
FIG. 5 depicts a flow chart diagram of an example method for imputation of transshipment locations according to example embodiments of the present disclosure.

However, if it is determined at 406 that the vehicle location data does not indicate a current or future presence of one or more related shipping vehicles at the destination within the threshold period of time, then method 400 can optionally proceed to FIG. 5 or can simply end.

Referring still to FIG. 4, at 408, the computing system can determine whether a shared destination exists between the shipping vehicle and the one or more related shipping vehicles that are scheduled to visit the destination (e.g., within a threshold amount of time from the currently estimated destination discharge date). For example, in some implementations, a shared destination is only considered to exist if the two vehicles visit the same destination within a threshold amount of time (e.g., 10 days, 30 days, etc.) of each other.

If it is determined at 408 that a shared destination does not exist between the shipping vehicle and the one or more related shipping vehicles that are scheduled to visit the destination, then method 400 can optionally proceed to FIG. 5 or can simply end.

However, if it is determined at 408 that a shared destination exists between the shipping vehicle and the one or more related shipping vehicles that are scheduled to visit the destination, then method 400 can proceed to 410. At 410, the computing system can predict the shared destination as the transshipment location. In some implementations, the date(s) at which the shipping vehicle and the related shipping vehicle visit the shared destination can be imputed as the transshipment date.

In some implementations, if multiple related vehicles are identified that have shared destinations with the shipping vehicle and that are scheduled to visit the destination, then a probability analysis can be performed to select the most probable of such related vehicles (and corresponding shared destinations) to impute for the transshipment. As one example, related vehicles that are operated by the same carrier can be assigned a higher probability. As another example, related vehicles that minimize a delivery delay amount or an "in-stack" waiting time associated with the cargo can be assigned a higher probability. As another example, historical shipping records can be analyzed to understand patterns of transshipment among specific vehicles and evaluate the probability that a certain related vehicle will take transshipment of the item of cargo from the shipping vehicle.

As another example technique to predict the transshipment location, FIG. 5 depicts a flow chart diagram of an example method 500 to impute transshipment locations according to example embodiments of the present disclosure. In some implementations, method 500 can be performed in combination with (e.g., subsequent to) method 400 of FIG. 4. In other implementations, method 500 is performed in lieu of method 400 or otherwise performed independent of method 400.

Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can access historical shipment data that includes historical shipment records. For example, the historical shipment data can be "after-the-fact" or corrected records that show the actual itineraries according to which various items of cargo were transported in the past.

At 504, the computing system can filter the historical shipment data to identify a subset of the historical shipment records that have one or more shared logistical characteristics with the itinerary data. For example, the historical shipment data can be filtered according to any logical combination of filters to identify historical shipment records that are similar to the itinerary currently being analyzed. As one example, at 504, the computing system can filter the historical shipment data to identify a subset of the historical shipment records that share each of the following characteristics: same current port of load; same next port of handling; and same carrier. In some instances, this combination of characteristics can be referred to as the itinerary's "trade lane." However, various other combinations of filters (e.g., in an "and" configuration or an "or" configuration) can be employed.

At 506, the computing system can generate, based at least in part on the subset of historical shipment records, one or more probable transshipment locations. In particular, the computing system can analyze the subset of records to understand the frequency with which certain locations were used for transshipment in the evidenced shipping services. To provide a simplified example for illustration, an analysis of the subset of historical shipment records may indicate that 50% of records evidence a transshipment at Location F; 25% of records evidence a transshipment at Location G; 5% of records evidence a transshipment at Location H; and 20% of records evidence no transshipment. In some implementations, a record can evidence multiple transshipments.

At 508, the computing system can sort the probable transshipment locations from most probable to least probable. For example, the locations can be sorted as follows: F>G>H.

At 510, the computing system can consider the next probable transshipment location. For example, at the first instance of 510, the computing system can consider Location F.

At 512, the computing system can determine whether the vehicle location data indicates a current or future presence of the shipping vehicle at the currently considered probable transshipment location (e.g., within a threshold period of time such as 10 days, 30 days, etc.).

If it is determined at 512 that the vehicle location data does not indicate a current or future presence of the shipping vehicle at the current considered probable transshipment location (e.g., within the threshold period of time), then method 500 can return to 510 and consider the next probable transshipment location. For example, at the second instance of 510, Location G can be considered. Thus, each probable location can be iteratively considered according to probability until a positive match is found.

However, referring still to 512, if it is determined that the vehicle location data does not indicate a current or future presence of the shipping vehicle at the current considered probable transshipment location (e.g., within the threshold period of time), then method 500 can proceed to 514. At 514, the computing system can predict the currently considered probable location as the transshipment location. For example, if it was determined at 512 that the vehicle schedule for the shipping vehicle indicates presence of the shipping vehicle at Location F within the appropriate time range, then Location F can be imputed as the transshipment location at 514. Similarly, the date at which the vehicle schedule indicates that the shipping vehicle is at Location F can be imputed as the transshipment date.

However, in some implementations, all probable transshipment locations are considered, and a prediction is made following consideration of all probable locations. Thus, contrary to the flow illustrated in FIG. 5, if "yes" is found at 512, the method 500 may return to 510 and consider the next probable transshipment location, until all probable transshipment locations have been considered. Then, after all probable transshipment locations have been considered, the method 500 can include making a prediction regarding a transshipment location relative to the probable transshipment locations.

More particularly, in some implementations, certain other constraints can be evaluated (e.g., at 512) in addition to the primary consideration already discussed. For example, a secondary constraint can include a requirement that the currently considered location can be selected only if some number (e.g., the top two) of the most probable locations are not scheduled to be visited by the shipping vehicle within the threshold period of time. Thus, to continue the example, if the vehicle location data for the shipping vehicle indicates that the first vehicle is scheduled to visit both Location F and Location G, then, in some implementations, the computing system may be prohibited from imputing Location F at 514. For example, no location can be imputed, or the computing system can impute both Location F and Location G (e.g. while retaining their respective probability information).

Referring again to FIG. 3, as another example technique to predict the transshipment location at 308, the computing system can input the itinerary data and the vehicle location data into a machine-learned transshipment prediction model that is configured to receive and process the itinerary data and the vehicle location data to predict the transshipment location. The computing system can receive the transshipment location as an output of the machine-learned transshipment prediction model. In some implementations, the machine-learned transshipment prediction model has been trained based on a set of training data comprising a plurality of training examples, each training example comprising a historical shipment itinerary that has been labeled with a ground truth transshipment location that was omitted from the historical shipment itinerary. The model can also be trained to predict the date of transshipment.

Referring still to FIG. 3, after the transshipment location is predicted at 308, at 310, the computing system can update the itinerary data to include the predicted transshipment location. For example, at 310, updating the itinerary can include inserting the imputed transshipment location into a data record (e.g., stored in a database 107) associated with the itinerary, the item of cargo, and/or a shipment number. In some implementations, to update the itinerary at 310, the computing system can also predict or otherwise update additional information regarding the item of cargo based on the imputed transshipment location, including, as examples, a current location of the item of cargo, a predicted date of discharge for the item of cargo at the destination, predicted identities of the shipment vehicle(s), and/or the like.

In some implementations, the computing system can include and use one or more machine-learned itinerary update models to generate updates to the itinerary based on the imputed transshipment locations at 310. For example, the machine-learned itinerary update models can be configured to receive and process data that describes the original itinerary data and imputed changes to the itinerary data (e.g., addition of transshipment locations) to produce additional updates to the itinerary (e.g., updated discharge dates, etc.).

In some implementations, after 310, the method 300 can return to 308 and attempt to predict an additional transshipment location and/or date based on the updated itinerary data. Thus, in some implementations, multiple transshipments can be sequentially predicted (e.g., until no additional transshipment can be predicted with sufficient confidence).

At 312, the computing system can enable supply chain adjustments based on the updated itinerary data. For example, at 312, the computing system perform automatic supply chain adjustments based on the updated itinerary. As examples, the computing system can proactively detect, share and resolve shipment issues. For example, the computing system can generate and transmit automatic alerts to the shipper, carrier, and/or customers and/or partners of the shipper that indicate the updated itinerary. The alerts can provide the updated information and, in some implementations, include adjustments to previously provided orders, requests, invoices, and/or the like. Thus, for example, if it is detected based on the imputed transshipment that the item of cargo will now be two days earlier, the delivery of materials or products planned to be combined (e.g., in a manufacturing sense) with such item of cargo can be requested to be supplied by other providers two days earlier as well, thereby enabling the most efficient combination of the item of cargo with such materials or products. Likewise, the labor associated with the combination can be automatically scheduled for two days earlier than previously requested. As another example, an invoice can be automatically sent based on the updated itinerary. Thus, in some implementations, logical connections and/or dependencies between multiple different shipments, orders, labor requests, facilities management plans, and/or the like can be established (e.g., by the shipper and/or a customer of the shipper) and these logical connections can be used to perform automatic supply chain adjustments.

In some implementations, the computing system can include and use at 312 or more machine-learned supply chain adjustment models to generate adjustments to one or more facets of a supply chain that are interrelated to the item of cargo based on the updated itinerary. For example, the machine-learned supply chain adjustment models can be configured to receive and process data that describes the original itinerary data and the updated itinerary data to produce automatic supply chain adjustments (e.g., modification of requested delivery dates or labor fulfillment dates).

Thus, aspects of the present disclosure provide a solution for incomplete or inaccurate itineraries for shipments (e.g., containers transported via an ocean-going container ship). In particular, through prediction of transshipment locations, aspects of the present disclosure enable predictive visibility into shipment status, thereby enabling proactive supply chain management actions which improve supply chain efficiency and the customer experience. For example, a shipper of the item of cargo can access the updated data record (e.g., via a web application or platform supplied by the supply chain management computing system) to receive the updated information regarding the item of cargo and/or the supply chain management computing system can provide notifications, alerts, and/or the like to the shipper. This can enable the shipper to better optimize the supply chain to reflect or account the updated itinerary of the item of cargo.

Example Model Configurations

Figure 6:
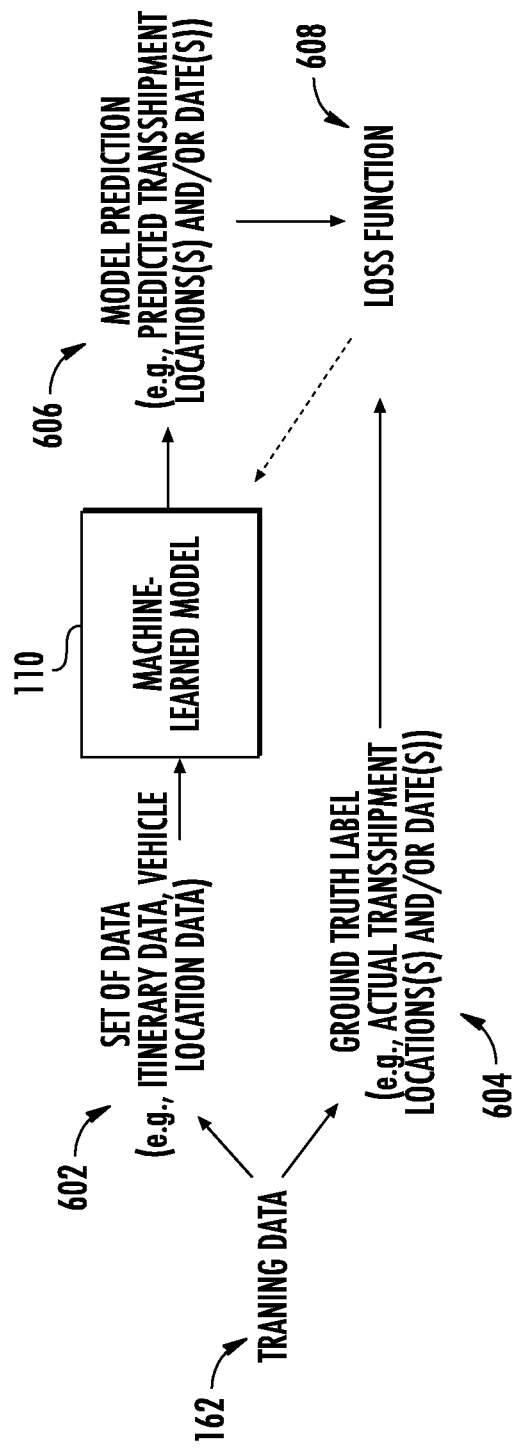
FIG. 6 depicts an example processing workflow for training a machine-learned model according to example embodiments of the present disclosure.

FIG. 6 depicts an example processing workflow for training a machine-learned model 110 according to example embodiments of the present disclosure. In particular, the illustrated training scheme trains the model 110 based on a set of training data 162.

The training data 162 can include, for example, historical data that indicates the historical outcomes of various previous shipments (e.g., which may take the form of shipping logs). In some implementations, the training data 162 can include a plurality of training example pairs, where each training example pair provides: (602) a set of data (e.g., incorrect and/or incomplete data); and (604) a ground truth label associated with such set of data, where the ground truth label provides a "correct" prediction for the set of data. For example, the training example can include: (602) itinerary and/or vehicle location data that was collected prior or during a shipment; and (604) a ground truth label derived from historical data that indicates what the actual itinerary or schedule was for such shipment.

As one example, a training example pair can include: (602) additional schedule data from carriers; data obtained from ports, railyards, distribution centers, and/or the like; historical vehicle location data or inferences (e.g., interpolations) derived therefrom; vehicle tracking (e.g., AIS) data; and/or the like; and (604) refined vehicle location data. As another example, a training example pair can include: (602) itinerary data, vehicle location data, and/or other forms of data; and (604) one or more ground truth transshipment locations. As yet another example, a training example pair can include: (602) an original set of itinerary data and changes to such itinerary data (e.g., addition of transshipment locations); and (604) additional updates to the itinerary (e.g., predicted new discharge dates, etc.). As another example, a training example pair can include: (602) data that describes an original itinerary and an updated itinerary (e.g., including predicted new transshipment locations, predicted new discharge dates, etc.); and (604) automatic supply chain adjustments (e.g., modification of requested delivery dates or labor fulfillment dates) that should be performed based on change from the original itinerary to the updated itinerary.

Based on the set of data 602, the machine-learned model 110 can produce a model prediction 606. As examples, the model prediction 606 can include a prediction of the ground truth label 604. Thus, as one example, if the ground truth label 604 provides one or more actual transshipment location(s) and/or date(s), then the model prediction 606 can correspond to predicted transshipment location(s) and/or date(s).

A loss function 608 can evaluate a difference between the model prediction 606 and the ground truth label 604. For example, a loss value provided by the loss function 608 can be positively correlated with the magnitude of the difference.

The model 110 can be trained based on the loss function 608. As an example, one example training technique is backwards propagation of errors ("backpropagation"). For example, the loss function 608 can be backpropagated through the model 110 to update one or more parameters of the model 110 (e.g., based on a gradient of the loss function 608). Various loss functions can be used such as mean squared error, likelihood loss, cross entropy loss, hinge loss, and/or various other loss functions. Gradient descent techniques can be used to iteratively update the parameters over a number of training iterations.

Figure 7:
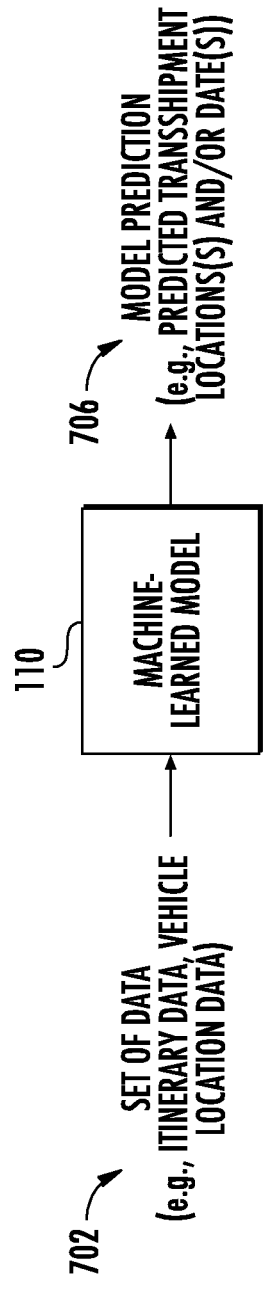
FIG. 7 depicts an example processing workflow for employing a machine-learned model according to example embodiments of the present disclosure.

FIG. 7 depicts an example processing workflow for employing the machine-learned model 110 following training according to example embodiments of the present disclosure.

As illustrated in FIG. 7, the machine-learned model 110 can be configured to receive and process a set of data 702. The set of data 702 can be of any of the different types of data discussed with respect to 602 of FIG. 6, or other forms of data. As one example, the set of data 702 can include itinerary data and/or vehicle location data.

In response to the set of data 702, the machine-learned model 110 can produce a model prediction 706. The model prediction 706 can be of any of the different types of data discussed with respect to 604 or 606 of FIG. 6, or other forms of data. As one example, the model prediction 706 can include one or more predicted transshipment location(s) and/or date(s).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for imputation of transshipment locations, the method comprising:
   training, by a computing system comprising one or more computing devices, a machine learning model (i) using a set of training data indicating a set of historical outcomes of a set previous shipments, (ii) based on a loss function evaluating a difference between a model prediction and a ground truth label being backpropagated through the machine learning model to update at least one parameter of the machine learning model, and (iii) by performing at least one generalization technique to improve a generalization capability of the machine learning model;
   obtaining, by the computing system, itinerary data that identifies a planned shipment of an item of cargo from an origin location to a destination location by a shipping vehicle without identifying a transshipment location for the item of cargo;
   generating, by a set of location devices respectively located on the shipping vehicle and a set of different shipping vehicles, vehicle location data describing a set of locations respectively of the shipping vehicle and the set of different shipping vehicles;
   analyzing, by the machine learning model, the itinerary data and the vehicle location data to:
      identify a plurality of probable transshipment locations that are sorted based on a respective frequency with which the respective probable transshipment location was previously used for transshipment,
      determine that the vehicle location data indicates a first current or future presence of the shipping vehicle at a first probable transshipment location of the plurality of probable transshipment locations, the first probable transshipment location having the highest frequency use for transshipment of the plurality of probable transshipment locations, and
      based on determining that the vehicle location data indicates the first current or future presence of the shipping vehicle at the first probable transshipment location, predict that the first probable transshipment location will be a transshipment location at which the item of cargo is transferred from the shipping vehicle to the different shipping vehicle;
   inserting, by the computing system, the transshipment location into a data record associated with the planned shipment to produce an updated data record;
   obtaining, by the computing system, vehicle schedule data that describes schedules of the shipping vehicle and the set of different shipping vehicles; and
   refining, by the computing system using a schedule refinement machine learning model and based at least in part on the vehicle location data, the vehicle schedule data to produce refined vehicle schedule data.

2. The computer-implemented method of claim 1, wherein the set of different shipping vehicles is related to the shipping vehicle via shared inclusion within a carrier network.

3. The computer-implemented method of claim 1, the vehicle schedule data comprises:
   shifting dates provided by the vehicle schedule data such that a scheduled location provided by the vehicle schedule data for the shipping vehicle aligns with a current location of the shipping vehicle.

4. The computer-implemented method of claim 1, further comprising:
   prior to analyzing the itinerary data and the vehicle location data:
      obtaining, by the computing system, historical vehicle data that describes historical locations of the shipping vehicle; and
      refining, by the computing system, the vehicle location data based at least in part on the historical vehicle data to produce refined vehicle location data.

5. The computer-implemented method of claim 1, further comprising:
   analyzing, by the machine learning model, the itinerary data and the vehicle location data to further predict one or more additional transshipment locations based at least in part on the transshipment location.

6. The computer-implemented method of claim 1, further comprising:
   predicting, by the computing system, a current location of the item of cargo based at least in part on the transshipment location.

7. The computer-implemented method of claim 1, further comprising:
   predicting, by the computing system, an updated discharge date of the item of cargo at the destination location based at least in part on the transshipment location.

8. The computer-implemented method of claim 7, further comprising:
   detecting, by the computing system, when the updated discharge date fails to satisfy a target discharge date; and when the updated discharge date fails to satisfy a target discharge date:
      providing, by the computing system, an alert to a shipper computing device associated with a shipper of the item of cargo.

9. The computer-implemented method of claim 1, wherein the shipping vehicle comprises an origin shipping vehicle planned to load the item of cargo at the origin location.

10. A supply chain management computing system, comprising:
   a set of location devices respectively located on a shipping vehicle and a set of different shipping vehicles, the set of location devices configured to generate vehicle location data describing a set of locations respectively of the shipping vehicle and the set of different shipping vehicles;

one or more processors; and one or more non-transitory computer-readable media that collectively store instructions that, when executed by the one or more processors, cause the supply chain management computing system to perform operations comprising:

training a machine learning model (i) using a set of training data indicating a set of historical outcomes of a set previous shipments, (ii) based on a loss function evaluating a difference between a model prediction and a ground truth label being backpropagated through the machine learning model to update at least one parameter of the machine learning model, and (iii) by performing at least one generalization technique to improve a generalization capability of the machine learning model;

obtaining itinerary data that identifies a planned shipment of an item of cargo from an origin location to a destination location by a shipping vehicle without identifying a transshipment location for the item of cargo;

analyzing, by the machine learning model, the itinerary data and the vehicle location data to:

identify a plurality of probable transshipment locations that are sorted based on a respective frequency with which the respective probable transshipment location was previously used for transshipment, determine that the vehicle location data indicates a first current or future presence of the shipping vehicle at a first probable transshipment location of the plurality of probable transshipment locations, the first probable transshipment location having the highest frequency use for transshipment of the plurality of probable transshipment locations, and based on determining that the vehicle location data indicates the first current or future presence of the shipping vehicle at the first probable transshipment location, predict that the first probable transshipment location will be a transshipment location at which the item of cargo is transferred from the shipping vehicle to the different shipping vehicle;

inserting the transshipment location into a data record associated with the planned shipment to produce an updated data record;

obtaining vehicle schedule data that describes schedules of the shipping vehicle and the set of different shipping vehicles; and refining, using a schedule refinement machine learning model and based at least in part on the vehicle location data, the vehicle schedule data to produce refined vehicle schedule data.

11. The supply chain management computing system of claim 10, wherein the set of different shipping vehicles is related to the shipping vehicle via shared inclusion within a carrier network.

12. The supply chain management computing system of claim 10, wherein the operations for refining the vehicle schedule data comprise operations for:

shifting dates provided by the vehicle schedule data such that a scheduled location provided by the vehicle schedule data for the shipping vehicle aligns with a current location of the shipping vehicle.

13. The supply chain management computing system of claim 10, wherein the instructions that, when executed by the one or more processors, cause the supply chain management computing system to perform operations further comprising:

prior to analyzing the itinerary data and the vehicle location data:

obtaining historical vehicle data that describes historical locations of the shipping vehicle; and refining the vehicle location data based at least in part on the historical vehicle data to produce refined vehicle location data.

14. One or more non-transitory computer-readable media that instructions that, when executed by one or more processors, cause a supply chain management computing system to perform operations comprising:

training a machine learning model (i) using a set of training data indicating a set of historical outcomes of a set previous shipments, (ii) based on a loss function evaluating a difference between a model prediction and a ground truth label being backpropagated through the machine learning model to update at least one parameter of the machine learning model, and (iii) by performing at least one generalization technique to improve a generalization capability of the machine learning model;

obtaining itinerary data that identifies a planned shipment of an item of cargo from an origin location to a destination location by a shipping vehicle without identifying a transshipment location for the item of cargo;

generating, by a set of location devices respectively located on the shipping vehicle and a set of different shipping vehicles, vehicle location data describing a set of locations respectively of the shipping vehicle and the set of different shipping vehicles;

analyzing, by the machine learning model, the itinerary data and the vehicle location data to:

identify a plurality of probable transshipment locations that are sorted based on a respective frequency with which the respective probable transshipment location was previously used for transshipment, determine that the vehicle location data indicates a first current or future presence of the shipping vehicle at a first probable transshipment location of the plurality of probable transshipment locations, the first probable transshipment location having the highest frequency use for transshipment of the plurality of probable transshipment locations, and based on determining that the vehicle location data indicates the first current or future presence of the shipping vehicle at the first probable transshipment location, predict that the first probable transshipment location will be a transshipment location at which the item of cargo is transferred from the shipping vehicle to a different shipping vehicle;

inserting the transshipment location into a data record associated with the planned shipment to produce an updated data record;

obtaining vehicle schedule data that describes schedules of the shipping vehicle and the set of different shipping vehicles; and refining, using a schedule refinement machine learning model and based at least in part on the vehicle location data, the vehicle schedule data to produce refined vehicle schedule data.

* * * * *

UNITED STATES PATENT AND TRADEMARK OFFICE
CERTIFICATE OF CORRECTION

| | |
|---|---|
| PATENT NO. | : 11,610,174 B2 |
| APPLICATION NO. | : 16/529460 |
| DATED | : March 21, 2023 |
| INVENTOR(S) | : Thomas Janos Atwood et al. |

It is certified that error appears in the above-identified patent and that said Letters Patent is hereby corrected as shown below:

In the Claims

At Column 24, Line 18, "the vehicle" should be -- wherein refining the vehicle --.

At Column 24, Line 54, "and" should be at Line 53, after "date;" as a continuation paragraph.

Signed and Sealed this
Fifth Day of November, 2024

Katherine Kelly Vidal
*Director of the United States Patent and Trademark Office*